US011321771B1

(12) United States Patent
Horesh et al.

(10) Patent No.: US 11,321,771 B1
(45) Date of Patent: May 3, 2022

(54) SYSTEM AND METHOD FOR DETECTING UNSEEN OVERDRAFT TRANSACTION EVENTS

(71) Applicant: Intuit Inc., Mountain View, CA (US)

(72) Inventors: Yair Horesh, Hod Hasharon (IL); Yehezkel S. Resheff, Hod Hasharon (IL); Daniel Ben David, Hod Hasharon (IL); Daniel Vaisman, Hod Hasharon (IL)

(73) Assignee: Intuit Inc., Mountain View, CA (US)

( * ) Notice: Subject to any disclaimer, the term of this patent is extended or adjusted under 35 U.S.C. 154(b) by 219 days.

(21) Appl. No.: 16/429,131

(22) Filed: Jun. 3, 2019

(51) Int. Cl.
*G06Q 40/02* (2012.01)
*G06Q 20/10* (2012.01)

(52) U.S. Cl.
CPC ........... *G06Q 40/02* (2013.01); *G06Q 20/108* (2013.01)

(58) Field of Classification Search
CPC .............................. G06Q 40/02; G06Q 20/108
See application file for complete search history.

(56) References Cited

U.S. PATENT DOCUMENTS

| | | | | |
|---|---|---|---|---|
| 9,037,589 B2* | 5/2015 | Anderson | ............... | G06F 16/20 707/737 |
| 2009/0326998 A1* | 12/2009 | Watkins | ................. | G06Q 40/08 705/38 |
| 2013/0030993 A1* | 1/2013 | Peace | ................. | G06Q 20/4016 705/39 |
| 2017/0228777 A1* | 8/2017 | Fischer | .............. | G06Q 30/0267 |
| 2020/0012584 A1* | 1/2020 | Walters | ................. | G06F 16/335 |

* cited by examiner

*Primary Examiner* — Scott C Anderson
*Assistant Examiner* — Xavier M. Bennett
(74) *Attorney, Agent, or Firm* — DLA Piper LLP (US)

(57) ABSTRACT

System and method configured to evaluate financial transaction information and detect overdraft transaction events regardless of the financial institution associated with the event.

20 Claims, 8 Drawing Sheets

| Token | nsf_count | nonsf_count | nsf_count_norm | nonsf_count_norm | ratio |
|---|---|---|---|---|---|
| activity | 280 | 73 | | | |
| actoverdraft | 202 | 5 | | | |
| canceled | 190 | 21 | | | |
| cdn | 7 | 320 | | | |
| checkingoverdraft | 77 | 5 | | | |
| cheque | 7 | 262 | | | |
| dividend | 17 | 704 | | | |
| inquiry | 8 | 261 | | | |
| marketplace | 5 | 248 | | | |
| requested | 9 | 295 | | | |
| transactionposted | 195 | 5 | | | |
| zed | 86 | 13 | | | |

FIG. 4

| Token | nsf_count | nonsf_count | nsf_count_norm | nonsf_count_norm | ratio |
|---|---|---|---|---|---|
| actoverdraft | 202 | 5 | 0.214894 | 0.000518 | 415.131489 |
| transactionposted | 195 | 5 | 0.207447 | 0.000518 | 400.745745 |
| checkingoverdraft | 77 | 5 | 0.081915 | 0.000518 | 158.243191 |
| canceled | 190 | 21 | 0.202128 | 0.002174 | 92.969098 |
| zed | 86 | 13 | 0.091489 | 0.001346 | 67.976596 |
| odp | 188 | 40 | 0.200000 | 0.004141 | 48.295000 |
| activity | 280 | 73 | 0297872 | 0.007558 | 39.412999 |
| posting | 270 | 71 | 0.287234 | 0.007351 | 39.075966 |
| feerev | 15 | 5 | 0.015957 | 0.000518 | 30.826596 |
| atransaction | 15 | 5 | 0.015957 | 0.000518 | 30.826596 |
| authori | 92 | 31 | 0.097872 | 0.003209 | 30.495127 |
| fundingoverdraft | 14 | 5 | 0.014894 | 0.000518 | 28.771489 |
| helpurchase | 14 | 6 | 0.014894 | 0.000621 | 23.976241 |
| recurringxxx | 14 | 7 | 0.014894 | 0.000725 | 20.551064 |
| dragonpurchase | 14 | 7 | 0.014894 | 0.000725 | 20.551064 |
| saltpurchase | 14 | 7 | 0.014894 | 0.000725 | 20.551064 |
| burritpurchase | 10 | 5 | 0.010638 | 0.000518 | 20.551064 |
| barriopurchase | 10 | 5 | 0.010638 | 0.000518 | 20.551064 |

| token | nsf_count | nonsf_count | nsf_count_norm | nonsf_count_norm | ratio |
|---|---|---|---|---|---|
| activity | 31 | 5 | | | |
| actoverdraft | 13 | 5 | | | |
| canceled | 14 | 5 | | | |
| check | 2 | 8 | | | |
| checkingoverdraft | 13 | 5 | | | |
| dividend | 3 | 20 | | | |
| doug | 8 | 10 | | | |
| fdes | 9 | 10 | | | |
| inquiry | 3 | 20 | | | |
| make | 10 | 11 | | | |
| rpurchase | 9 | 11 | | | |
| transactionposted | 14 | 5 | | | |

FIG. 7

| token | nsf_count | nonsf_count | nsf_count_norm | nonsf_count_norm | ratio |
|---|---|---|---|---|---|
| activity | 31 | 5 | 0.407895 | 0.004230 | 96.426316 |
| posting | 28 | 5 | 0.368421 | 0.004230 | 87.094737 |
| odp | 23 | 5 | 0.302632 | 0.004230 | 71.542105 |
| transactionposted | 14 | 5 | 0.184211 | 0.004230 | 43.547368 |
| canceled | 14 | 5 | 0.184211 | 0.004230 | 43.547368 |
| checkingoverdraft | 13 | 5 | 0.171053 | 0.004230 | 40.436842 |
| actoverdraft | 13 | 5 | 0.171053 | 0.004230 | 40.436842 |
| pizzapurchase | 12 | 9 | 0.157895 | 0.007614 | 20.736842 |
| make | 10 | 11 | 0.131579 | 0.009306 | 14.138756 |
| nmo | 9 | 10 | 0.118421 | 0.008460 | 13.997368 |
| fdes | 9 | 10 | 0.118421 | 0.008460 | 13.997368 |
| servicnorth | 9 | 10 | 0.118421 | 0.008460 | 13.997368 |
| tpurchase | 10 | 12 | 0.131579 | 0.010152 | 12.960526 |
| grillpurchase | 9 | 11 | 0.118421 | 0.009306 | 12.724880 |
| tms | 9 | 11 | 0.118421 | 0.009306 | 12.724880 |
| newegg | 9 | 11 | 0.118421 | 0.009306 | 12.724880 |
| rpurchase | 9 | 11 | 0.118421 | 0.009306 | 12.724880 |
| restaurantpurchase | 9 | 11 | 0.118421 | 0.009306 | 12.724880 |
| doug | 8 | 10 | 0.105263 | 0.008460 | 12.442105 |
| pavilions | 8 | 10 | 0.105263 | 0.008460 | 12.442105 |

FIG. 8 ously unseen overdraft events for the second financial institution.
SYSTEM AND METHOD FOR DETECTING UNSEEN OVERDRAFT TRANSACTION EVENTS

DETAILED DESCRIPTION OF SEVERAL EMBODIMENTS

Embodiments described herein may be configured to evaluate financial transaction information and detect overdraft transaction events regardless of the financial institution associated with the event. For example, and as known in the art, overdraft transactions occur when a consumer does not have enough funds in its account to support the financial transaction. Usually overdraft events, also known as "non-sufficient fund" or "NSF" events, cost the user approximately $30 in fees by the financial institute associated with the event. Fees associated with overdraft events for a single year may total to billions of dollars in the United States alone. Financial management services such as Mint® by Intuit Inc. of Mountain View, Calif., predict overdraft events and are designed to alert users prior to the event. These financial management services will also advise the user as to what steps should be taken to avoid the predicted NFS event.

These predictions oftentimes require a model that is trained with data associated with financial transactions, including the transactions that are overdraft events. As can be expected, predicting overdraft events is a difficult task, which is exacerbated by the fact that there are numerous financial institutions, each with its own format (or multiple formats) for documenting that an overdraft event took place. For example, while some financial institutions use the phrase "overdraft fee" to indicate that an overdraft event took place, others use phrases such as "nsf fee" or "return items fee," to name a few. Because there are thousands of financial institutions, it is not feasible for a financial management system to track and maintain a list of the various ways each financial institution documents overdraft events. As can be expected, there will be "unseen" overdraft events in the data used to train the financial management services' prediction model. Accordingly, the prediction accuracy may suffer due to the unseen overdraft events. As such, there is a need to identify unseen overdraft events during the prediction process.

The disclosed systems and methods overcome the above-noted deficiencies and improve a model-based overdraft prediction process through use of an automated, transfer-learning approach with association rules to account for the different overdraft reporting methods used by different financial institutions. The disclosed principles may automatically learn signature patterns that are useful for distinguishing between two classes of interest (e.g., users that incurred an overdraft event and users that did not) in a set of transactions belonging to a single, specific financial institution (the "first financial institution"). Knowledge of the first financial institution's transactions and overdraft event transaction descriptions are used to determine a particular set of overdraft signatures. The set of overdraft signatures from the first financial institution are transferred and applied to a different set of users and transactions belonging to a different financial institution (the "second financial institution") to obtain an initial partition of the second financial institution's users into the two classes of interest (e.g., users that incurred an overdraft event and users that did not). The process continues by identifying transaction description features within the overdraft-incurred group and determining previ- An example process for evaluating financial transaction information and detecting overdraft/NSF transaction events may be as follows: inputting, at a first computing device and from a second computing device connected to the first computing device through a first network connection, first transaction data for users of associated with a first financial institution; extracting overdraft evaluation features (e.g., tokens) from the input first transaction data; splitting the extracted overdraft evaluation features into a plurality of groups based on previously stored overdraft feature signatures associated with transactions at a second financial institution; and for each group within the plurality of groups, the first computing device being adapted to score the extracted overdraft evaluation features in the group, and identify features within the extracted overdraft evaluation features corresponding to an overdraft transaction event for the first financial institution.

In one embodiment, the previously stored overdraft evaluation scores associated with transactions at the second financial institution are input from a trained machine learning overdraft evaluation model that evaluated second transaction data from the second financial institution.

Figure 1:
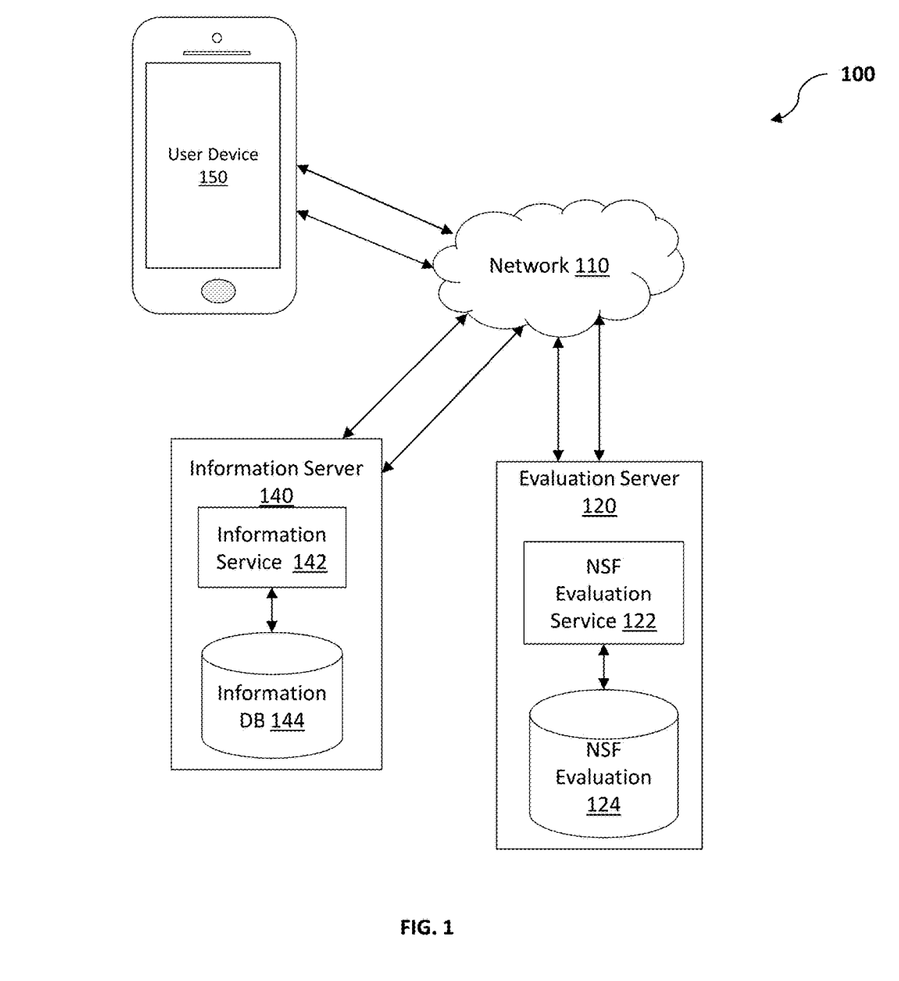
FIG. 1 shows an example of a system configured to evaluate financial transaction information and detect overdraft transaction events in accordance with the disclosed principles.

FIG. 1 shows a system 100 configured to evaluate financial transaction information and detect overdraft transaction events (i.e., NSF events) according to an embodiment of the present disclosure. System 100 may include evaluation server 120, information server 140, and/or user device 150. Network 110 may be the Internet and/or other public or private networks or combinations thereof. Evaluation server 120, information server 140, and/or user device 150 may be configured to communicate with one another through network 110. For example, communication between the elements may be facilitated by one or more application programming interfaces (APIs). APIs of system 100 may be proprietary and/or may be examples available to those of ordinary skill in the art such as Amazon® Web Services (AWS) APIs or the like.

Evaluation server 120 may be configured to train an evaluation model based on known overdraft descriptions and other features extracted from financial transactions associated with the first financial institution and evaluate financial transactions associated with the second financial institution to detect previously unseen and other overdraft events for users of the second financial institution. Evaluation server 120 may include an NSF evaluation service 122, which may be configured to collect and process the data, and an NSF evaluation database 124, which may be configured to store the collected data and/or the outcome of the processing by the NSF evaluation service 122. Detailed examples of the data gathered, processing performed, and the results generated are provided below.

Evaluation server 120 may gather the data from information server 140 and/or user device 150. For example, information server 140 may include information service 142, which may maintain financial transaction data of users of one or more financial institutions in an information database 144 and transmit the data to evaluation server 120. Information service 142 may be any network 110 accessible service that maintains customer usage/interaction with a product. A non-limiting example set of information services 142 may include Mint®, TurboTax®, QuickBooks®, QuickBooks Self-Employed®, QuickBooks Online®, LinkedIn®, Facebook®, other services, or combinations thereof. Detailed examples of the data gathered from information service 142 are provided below.

User device 150 may be any device configured to present user interfaces and receive inputs thereto. For example, user device 150 may be a smartphone, personal computer, tablet, laptop computer, or other device. In one embodiment, the user device 150 may execute or access the financial management services application that may be used to store financial transaction data in a database such as e.g., information database 144.

Evaluation server 120, information server 140, and user device 150 are each depicted as single devices for ease of illustration, but those of ordinary skill in the art will appreciate that evaluation server 120, information server 140, and/or user device 150 may be embodied in different forms for different implementations. For example, any or each of evaluation server 120 and information server 140 may include a plurality of servers. Alternatively, the operations performed by any or each of evaluation server 120 and information server 140 may be performed on fewer (e.g., one or two) servers. In another example, a plurality of user devices 150 may communicate with evaluation server 120 and/or information server 140. A single user may have multiple user devices 150, and/or there may be multiple users each having their own user device(s) 150.

Figure 2:
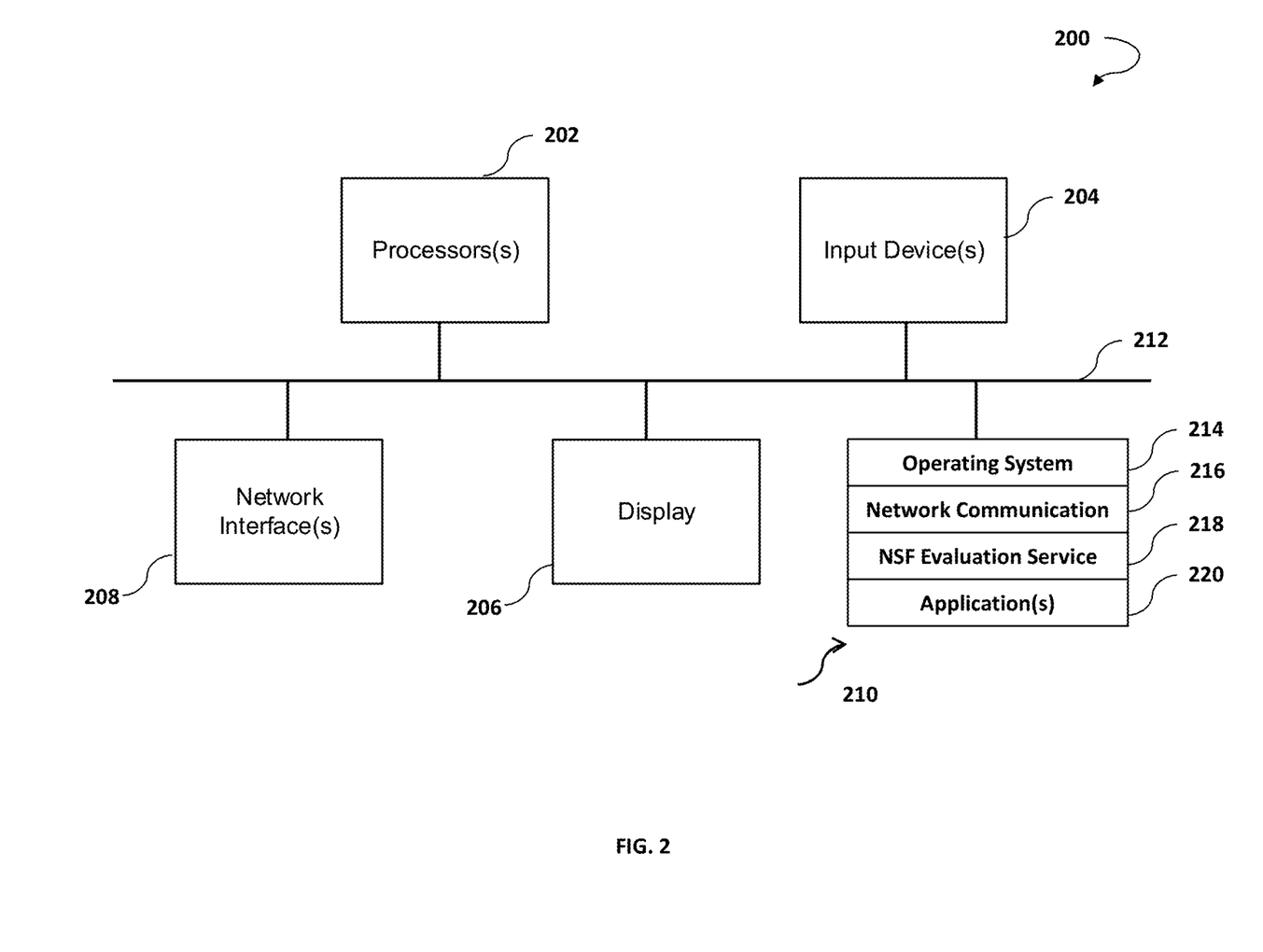
FIG. 2 shows a server device according to an embodiment of the present disclosure.

FIG. 2 is a block diagram of an example computing device 200 that may implement various features and processes as described herein. For example, computing device 200 may function as evaluation server 120, information server 140, or a portion or combination thereof in some embodiments. The computing device 200 may be implemented on any electronic device that runs software applications derived from compiled instructions, including without limitation personal computers, servers, smart phones, media players, electronic tablets, game consoles, email devices, etc. In some implementations, the computing device 200 may include one or more processors 202, one or more input devices 204, one or more display devices 206, one or more network interfaces 208, and one or more computer-readable media 210. Each of these components may be coupled by a bus 212.

Display device 206 may be any known display technology, including but not limited to display devices using Liquid Crystal Display (LCD) or Light Emitting Diode (LED) technology. Processor(s) 202 may use any known processor technology, including but not limited to graphics processors and multi-core processors. Input device 204 may be any known input device technology, including but not limited to a keyboard (including a virtual keyboard), mouse, track ball, and touch-sensitive pad or display. Bus 212 may be any known internal or external bus technology, including but not limited to ISA, EISA, PCI, PCI Express, NuBus, USB, Serial ATA or FireWire. Computer-readable medium 210 may be any medium that participates in providing instructions to processor(s) 202 for execution, including without limitation, non-volatile storage media (e.g., optical disks, magnetic disks, flash drives, etc.), or volatile media (e.g., SDRAM, ROM, etc.).

Computer-readable medium 210 may include various instructions 214 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 204; sending output to display device 206; keeping track of files and directories on computer-readable medium 210; controlling peripheral devices (e.g., disk drives, printers, etc.) which can be controlled directly or through an I/O controller; and managing traffic on bus 212. Network communications instructions 216 may establish and maintain network connections (e.g., software for implementing communication protocols, such as TCP/IP, HTTP, Ethernet, telephony, etc.).

NSF evaluation service instructions 218 may include instructions to train an evaluation model based on known overdraft features and other features extracted from financial transactions associated with a first financial institution and evaluate financial transactions associated with a second financial institution to detect previously unseen and other overdraft events for users of the second financial institution as described herein.

Application(s) 220 may be an application that uses or implements the processes described herein and/or other processes. The processes may also be implemented in operating system 214.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

Figure 3:
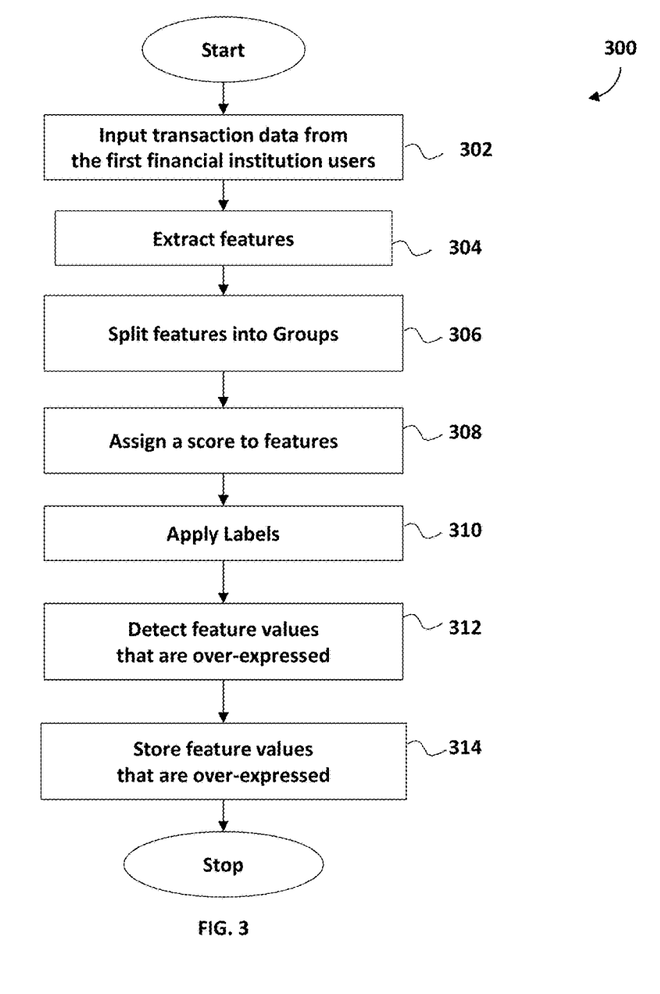
FIG. 3 shows an example machine learning model development process according to an embodiment of the present disclosure.
Figure 6:
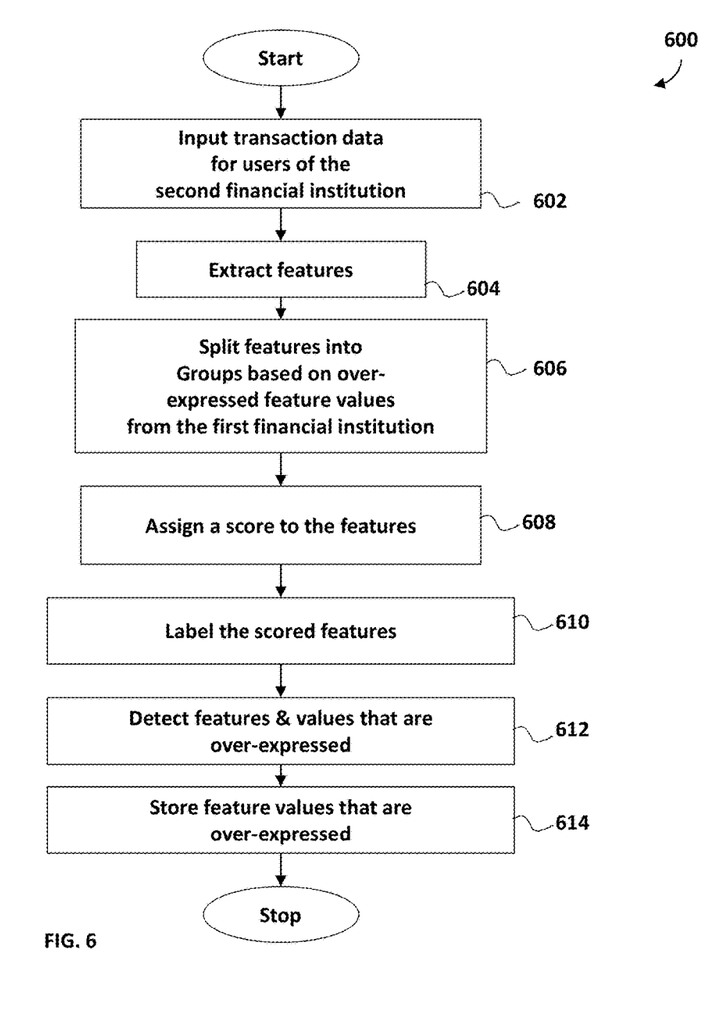
FIG. 6 shows an example process of detecting previously unseen and other overdraft transaction events using a transfer learning process according to an embodiment of the present disclosure.

FIGS. 3 and 6 respectively illustrate an example process 300 for training an evaluation model based on known overdraft event features and other features extracted from financial transactions associated with a first financial institution and a process 600 of evaluating the financial transactions associated with a second financial institution based on the trained model to detect previously unseen and other overdraft events for users of the second financial institution. System 100 may perform some or all of these processes illustrated in FIGS. 3 and 6.

Specifically, FIG. 3 shows an example machine learning model development process 300 according to an embodiment of the present disclosure. At step 302, the evaluation server 120, via NSF evaluation service 122, accesses and or receives financial transaction data for customers/users associated with the first financial institution. The financial transaction data for the customers/users associated with the first financial institution may be accessed or received from the information database 144 of the information server 140 executing the information service 142. In one embodiment, the information service 142 may be a financial management service such as Mint®, a tax preparation application such as TurboTax®, or an accounting application such as QuickBooks®, QuickBooks SelfEmployed®, or QuickBooks Online®, each of which are provided by Intuit Inc. of Mountain View, Calif.

The input financial transaction data may include user data and transaction attributes such as e.g., transaction date and amount, the identification of the merchant or payee, the identification of the financial institution, and a description of the transaction. As can be appreciated, the input financial transaction data may contain data associated with transactions that lead to overdraft events and transactions that did not. As is described below in more detail, the descriptions of the transactions, which may be a textual and/or graphical descriptions of the transactions, may be used to identify transactions that were or were not associated with an overdraft event. In one embodiment, the first financial institution is an institution that has been well-studied or previously studied, such that knowledge of the transaction descriptions typically used by the first financial institution are already known, which may assist in the accuracy of the training process 300.

At step 304, features are extracted from the transaction descriptions of the financial transaction data and stored in a features table. In one embodiment, the features are "tokens." As is known in the art, tokenization is the process of chopping characters, such as sentences or phrases, into pieces referred to as tokens. The tokens are usually words or parts of words and the tokenization process usually discards punctuation. For example, the phrase "first, second, third" may be split into three tokens: 1) "first"; 2) "second"; and 3) "third". Neither token in this example would include the "," separating the words in the phrase.

Figure 4:
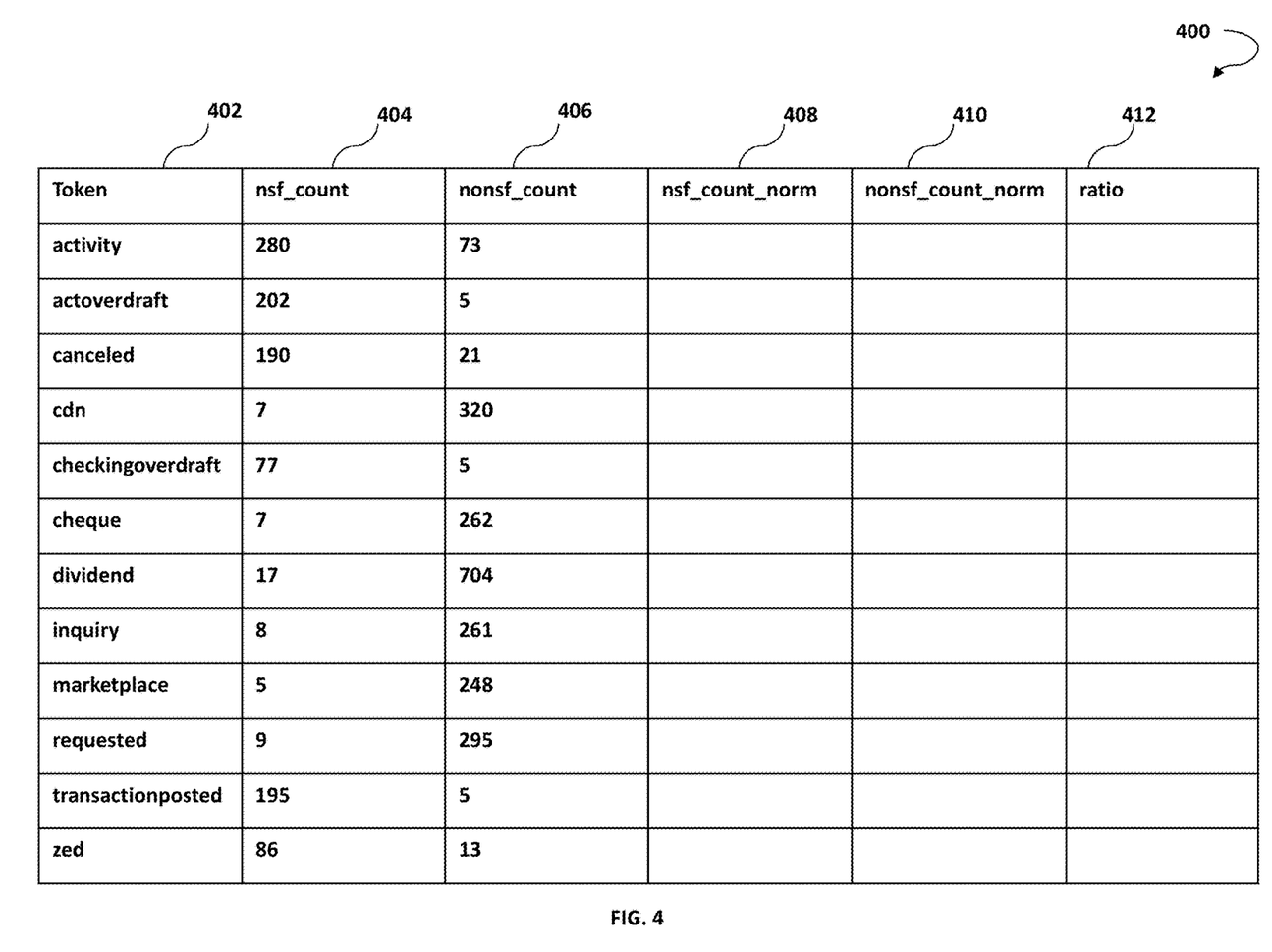
FIG. 4 shows an example of a features table comprising features associated with financial transactions for customers of a first financial institution.

FIG. 4 shows an example of a features table 400 comprising features associated with transactions for customers of the first financial institution. For example, in the illustrated example, the features table 400 may include a column 402 of extracted features (i.e., tokens) from step 304. For example, column 402 includes tokens identified as "activity," "actoverdraft," "canceled," "cdn," "checkingoverdraft," "cheque," among others. The table 400 includes a column 404 listing the number of times the token was associated with an overdraft event (nsf_count) and a column 406 listing the number of times the token was not associated with an overdraft event (nonsf_count). The features table 400 may also include a column 408 for a normalized number of times the token was associated with an overdraft event (nsf_count_norm), a column 410 listing a normalized number of times the token was not associated with an overdraft event (nonsf_count_norm), and a column 412 containing a score (ratio) in accordance with the disclosed principles and as described below. It should be appreciated that the illustrated features table 400 is merely an example and that the contents of the extracted features would be dependent upon the transaction descriptions utilized by the first financial institution.

At step 306, the collected set of features are split into two groups: a first group identified as features from transactions that incurred an overdraft event (i.e., group 1) and a second group identified as features from transactions that did not incur an overdraft event (i.e., group 2). In one embodiment, the process of splitting up the features into groups 1 and 2 can be performed randomly, splitting the features into one of the groups by any random process. In one embodiment, the process of splitting up the features into groups 1 and 2 can be performed based on known overdraft event signatures that were previously studied for the first institution and stored in the evaluation database 124. In another embodiment, the collected set of features are split into the two groups based on overdraft event signatures that were obtained manually by e.g., an operator of the evaluation server 120, information server 140, or from the first financial institution itself. In one embodiment, the features in group 1 can be put into a separate features table for group 1 features while the features in group 2 can be put into a separate features table for group 2 features. Alternatively, instead of separate tables, an additional column/identifier can be added to the feature table 400 in which the identifier indicates whether a token is in group 1 or group 2.

At step 308, each feature in the features table is assigned a score in accordance with the disclosed principles. In one embodiment, features in group 1 (i.e., the features split into a group of transactions that incurred an overdraft event) may be scored as follows:

1) apply a smoothing factor to the nsf_count within column 404 (i.e., the number of times the token was associated with an overdraft event) and apply the smoothing factor to the nonsf_count within column 406 (i.e., the number of times the token was not associated with an overdraft event).

Figure 5:
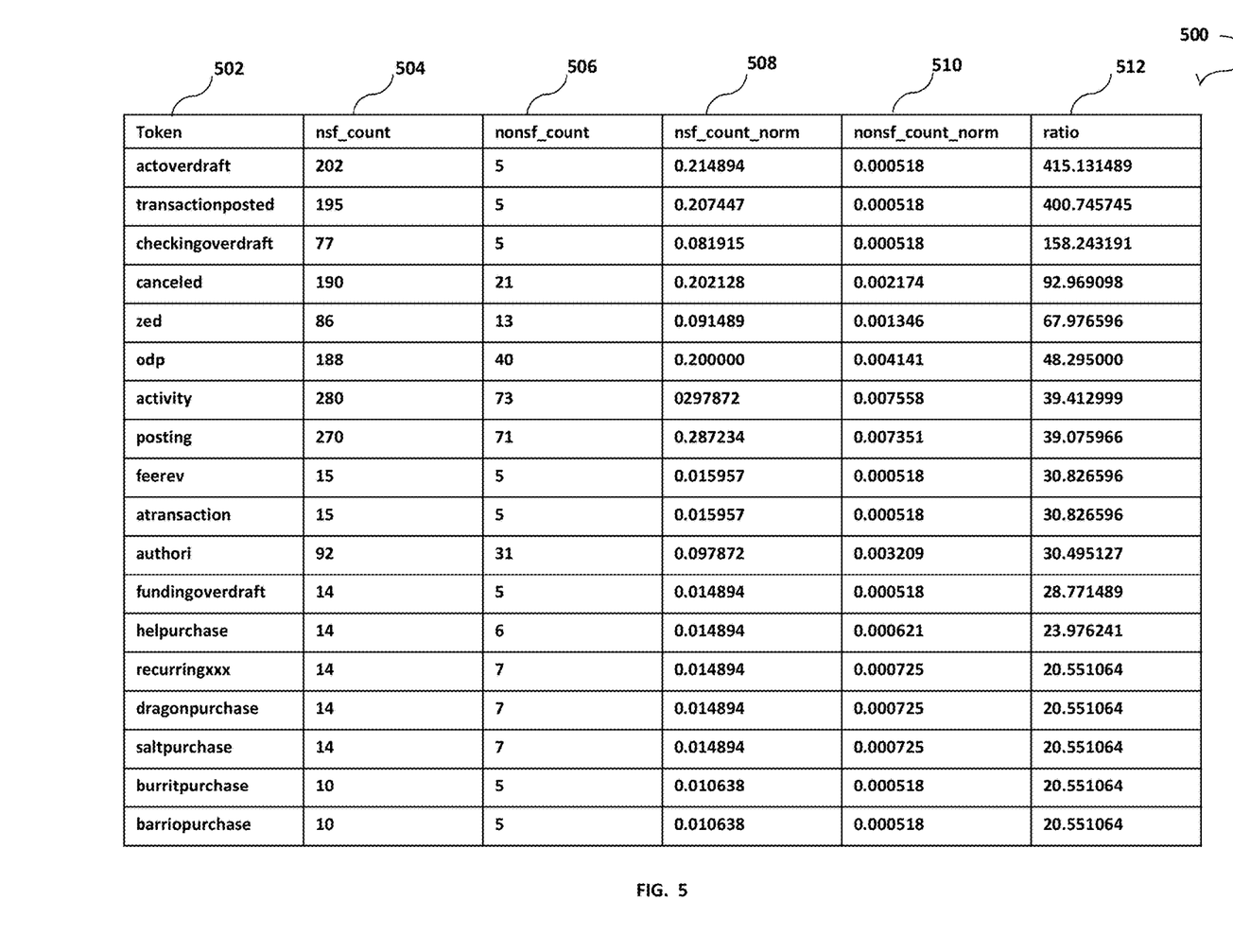
FIG. 5 shows an example of a features table comprising features most likely associated with an overdraft transaction event for customers of the first financial institution.

2) generate normalized counts of the smoothed nsf_count and nonsf_count. For example, the smoothed number of times a particular token was associated with an overdraft event (nsf_count) may be normalized (nsf_count_norm) by being divided by the total number of users with overdraft events and the smoothed number of times the token was not associated with an overdraft event (nonsf_count) may be normalized by being divided by the total number of users without overdraft events. The normalized nsf_count (i.e., nsf_count_norm) may be stored in its own column (e.g., column 408) and the normalized nonsf_count (i.e., nonsf_count_norm) may be stored in its own column (e.g., column 410). Sample values for the normalized nsf_count (i.e., nsf_count_norm) and normalized nonsf_count (i.e., nonsf_count_norm) are shown in FIG. 5 (discussed below).

3) calculate the score based on the normalized counts. For example, the score for an overdraft incurred token is the normalized count of overdraft incurred users (nsf_count_norm) divided by the normalized count of never incurred overdraft users (nonsf_count_norm). In essence, the score for an overdraft incurred token is a ratio of the normalized counts. That is, the score for an overdraft incurred token (Score_NSF_Token)=nsf_count_norm/nonsf_count_norm. That score may be stored in a "score" column (e.g., column 412). Sample scores are shown in FIG. 5 (discussed below).

In one embodiment, features in group 2 (i.e., the features split into a group of transactions that did not incur an overdraft event) may be scored by taking the inverse of the score for an overdraft incurred token (Score_NSF_Token) calculated above. That is, the score for a did not incur an overdraft token (Score_NONSF_Token)=1/Score_NSF_Token. That score may be stored in the score column (e.g., column 412).

In accordance with the disclosed principles, the higher the score, the more likely the token is affiliated with its group. In one embodiment, a smoothing factor is a number between 5 to 10. It should be appreciated, however, that the disclosed embodiments could use other smoothing factors, or no smoothing factor at all. A smoothing factor may be required in the above calculations to compensate for the tokens that are strongly over-expressed (as discussed below) within one of the two groups.

At step 310, labels may be assigned to the scored features. That is, in one embodiment, each feature is assigned an "Incurred NSF" label or a "Did not incur NSF" label. In one embodiment, the labels are applied randomly while preserving the counts described above. Once the features are labeled, the highest scores for each group are recorded/stored in the evaluation database 124. Thus, the labels are shuffled. In one embodiment, the shuffling occurs as follows. After scoring each feature (token) a cutoff value (i.e., a threshold) is defined. Each feature with equal or higher value will be defined as "overexpressed." Setting an arbitrary cutoff value is problematic—different datasets and domains need different thresholds. One way to solve this problem is to define thresholds against the expected score of a random set. In one embodiment, the labels are shuffled between the two sets while preserving proportions (i.e., if the initial ratio was 1:10 for the overdraft Incurred group, it will stay 1:10 after the shuffle). The score to each member in the two shuffled groups is calculated and the highest score is used as an anchor for the threshold (e.g., twice the score as the highest score of a member in a random set of the same size).

Features (e.g., tokens) that are significantly over-expressed for each of the two groups may be detected at step 312 and stored in respective feature tables at step 314. In one embodiment, "over-expressed" features/tokens are the features/tokens having a score that exceeds the highest score in the shuffled set for their group by at least a factor of 2 or more. FIG. 5 shows an example of a features table 500 of features (e.g., tokens) determined to be most likely associated with an overdraft event for customers of the first financial institution. Although not shown, there may be a similar looking features table for features (e.g., tokens) determined to be most likely not to be associated with an overdraft event for customers of the first financial institution.

In the illustrated example, the features table 500 may include a column 502 of extracted features (i.e., tokens) with scores that are over-expressed in favor of the overdraft Incurred group. In the illustrated example, these features include tokens identified as "actoverdraft," "transactionposted," "checkingoverdraft," "canceled," among others. The table 500 may also include a column 504 listing the number of times the token was associated with an overdraft event (nsf_count) and a column 506 listing the number of times the token was not associated with an overdraft event (nonsf_count). The features table 500 may also include a column 508 for a normalized number of times the token was associated with an overdraft event (nsf_count_norm), a column 510 listing a normalized number of times the token was not associated with an overdraft event (nonsf_count_norm), and a column 512 containing a score (ratio) in accordance with the disclosed principles and as described above with respect to step 308.

In this example, there were 940 users that experienced an overdraft event and 9,659 that did not. The normalized number of times each token was associated with an overdraft event (nsf_count_norm) of column 508, normalized number of times each token was not associated with an overdraft event (nonsf_count_norm) of column 510, and score (ratio) of column 512 may be determined as discussed above. In the illustrated example, the tokens, counts, and scores are prioritized such that the highest 20 scores are listed first. Although not shown, in a feature table for features (e.g., tokens) determined to be most likely not to be associated with an overdraft transaction event for customers of the first financial institution, the tokens, counts, and scores are prioritized such that the lowest 20 scores are listed first. As should be appreciated, the counts, normalized counts and scores are merely examples and should not be used to limit the disclosed embodiments in any way. In one embodiment, more than 20 or less than 20 scored features may be presented in the features table 500. The knowledge of overdraft and non-overdraft features/tokens (i.e., signatures of overdraft events and non-overdraft events) associated with the first financial institution may be stored in the evaluation database 124 so that they may be used in subsequent processing.

As noted above, one feature of the disclosed principles is to transfer the learned knowledge associated with the first financial institution (i.e., the signatures associated with the first financial institution) to the financial transaction data associated with a second financial institution to identify previously unknown/unseen and other overdraft events for the second financial institution. One process for doing so is illustrated in FIG. 6. Specifically, FIG. 6 shows an example of a process 600 of detecting previously unseen and other overdraft events using a transfer learning process according to an embodiment of the present disclosure.

At step 602, the evaluation server 120, via NSF evaluation service 122, accesses and or receives financial transaction data for customers/users associated with the second financial institution. The financial transaction data for the customers/ users associated with the second financial institution may be accessed or received from the information database 144 of the information server 140 executing the information service 142. In one embodiment, the information service 142 may be a financial management service such as Mint®, a tax preparation application such as TurboTax®, or an accounting application such as QuickBooks®, QuickBooks Self-Employed®, or QuickBooks Online®, each of which are provided by Intuit Inc. of Mountain View, Calif.

The input financial transaction data may include user data and transaction attributes such as e.g., transaction date and amount, the identification of the merchant or payee, the identification of the financial institution, and a description of the transaction. As can be appreciated, the input financial transaction data may contain data associated with transactions that lead to overdraft events and transactions that did not. As is described below in more detail, the description of the transaction, which may be a textual and/or graphical description of the transaction, may be used to identify transactions that were or were not associated with an overdraft event. Unlike the financial transaction data associated with the first financial institution, the input financial transaction data associated with the users of the second financial institution is not well-known or previously studied, making it difficult (absent the processing disclosed herein) to detect and predict overdraft events.

Figure 7:
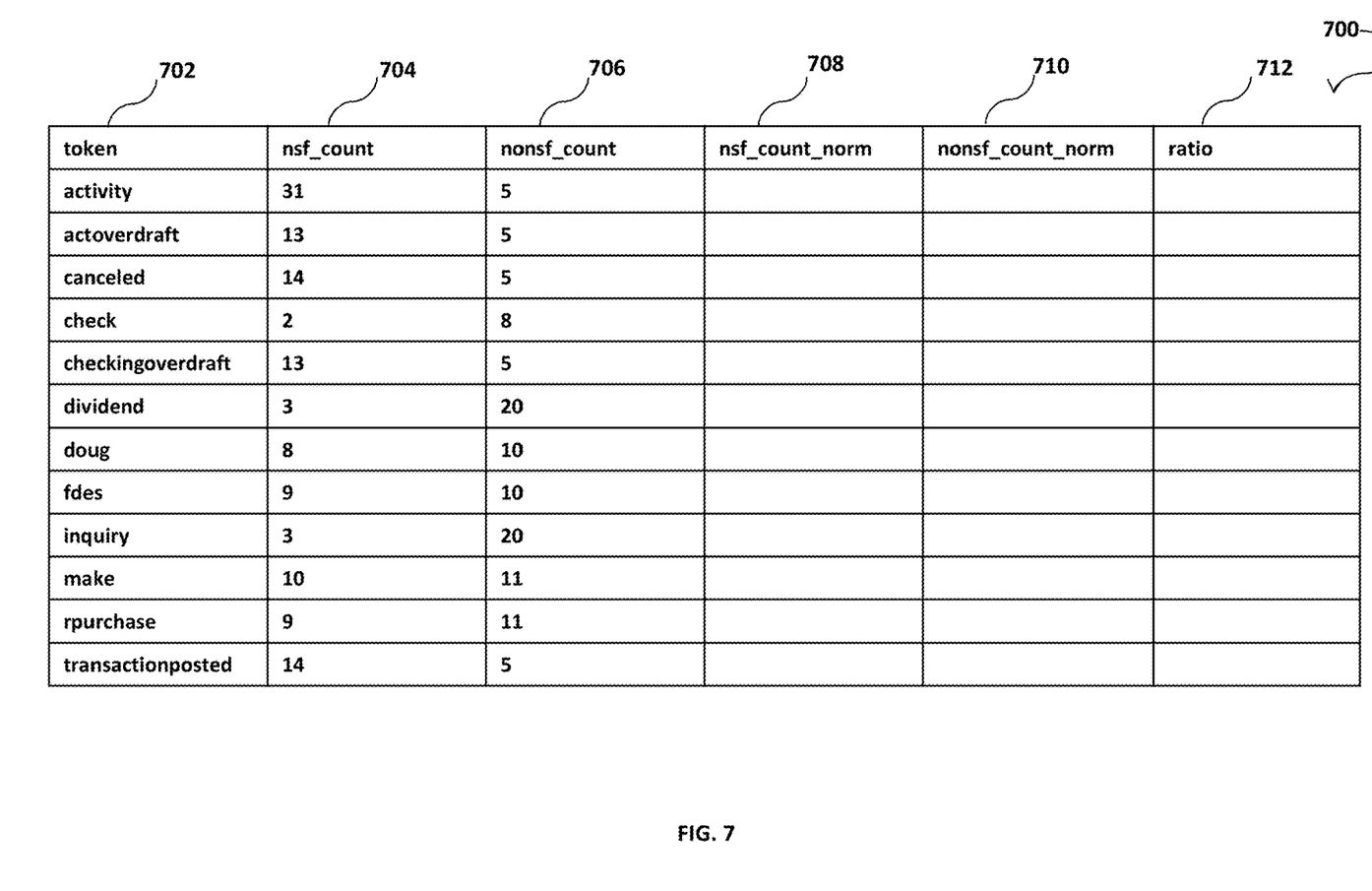
FIG. 7 shows an example of a features table comprising features associated with financial transactions for customers of a second financial institution.

At step 604, features are extracted from the transaction descriptions of the input financial transaction data and stored in a features table. In one embodiment, the features are "tokens." FIG. 7 shows an example of a features table 700 comprising features associated transactions for customers of the second financial institution. For example, in the illustrated example, the features table 700 may include a column 702 of extracted features (i.e., tokens) from step 604. For example, column 702 includes tokens identified as "activity," "actoverdraft," "canceled," "check," "checkingoverdraft," "dividend," "doug," among others. As can be appreciated, the features table 700 may include features that match features in the features table 400 associated with the first financial institution as well as features that are not found in the in the features table 400 associated with the first financial institution. The table 700 includes a column 704 listing the number of times the token was associated with an overdraft event (nsf_count) and a column 706 listing the number of times the token was not associated with an overdraft event (nonsf_count). The features table 700 may also include a column 708 for a normalized number of times the token was associated with an overdraft event (nsf_count_norm), a column 710 listing a normalized number of times the token was not associated with an overdraft event (nonsf_count_norm), and a column 712 containing a score (ratio) in accordance with the disclosed principles and as described below. It should be appreciated that the illustrated features table 700 is merely an example and that the contents of the extracted features would be dependent upon the transaction descriptions utilized by the second financial institution.

At step 606, the collected set of features are split into two groups: a first group identified as features from transactions that incurred an overdraft event (i.e., group 1) and a second group identified as features from transactions that did not incur an overdraft event (i.e., group 2). In one embodiment, the features are split by using the over-expressed feature scores from the stored signatures concerning the first institution. In one embodiment, the decision to which group a user is assigned to may be done by looking at the group of the highest scored tokens affiliated with the user's transactions that exist in the over-expressed sets, and choosing the group of tokens with the highest score.

There are two use cases, which exemplify the benefit of this process. First, the set of tokens identified for each group are used to classify unseen users to the right category. For example, if "dividend" and "inquiry" represent never incurred users with the scores 0.4 and 0.2, respectively, and "canceled" and "odp" represent incurred users with scores 0.6 and 0.8, respectively, an unseen user's transactions containing "odp", "dividend" and "inquiry" tokens would be classified as NSF-incurred since 0.8 is higher than 0.4+0.2. In another example use case, if the overexpressed tokens of the two groups is used to classify users on an untagged domain (FI), under conventional processing a less than optimal performance would be expected since the model is trained on a different FI. However, since the terminology overlaps, the classification according to the present disclosure can be used to bootstrap the process—that is, looking for overexpressed token at the two newly classified groups and captured new tokens on the way.

Once split, the process 600 will detect over expressed tokens in the overdraft incurred set of users based on the data for the second financial institution. In one embodiment, the process 600 may perform similar steps as discussed above with respect to FIG. 3.

For example, at step 608, each feature in the features table is assigned a score in accordance with the disclosed principles. In one embodiment, features in group 1 (i.e., the features split into a group of transactions that incurred an overdraft event) may be scored as follows:

1) apply a smoothing factor to the nsf_count within column 704 (i.e., the number of times the token was associated with an overdraft event) and apply the smoothing factor to the nonsf_count within column 706 (i.e., the number of times the token was not associated with an overdraft event).

Figure 8:
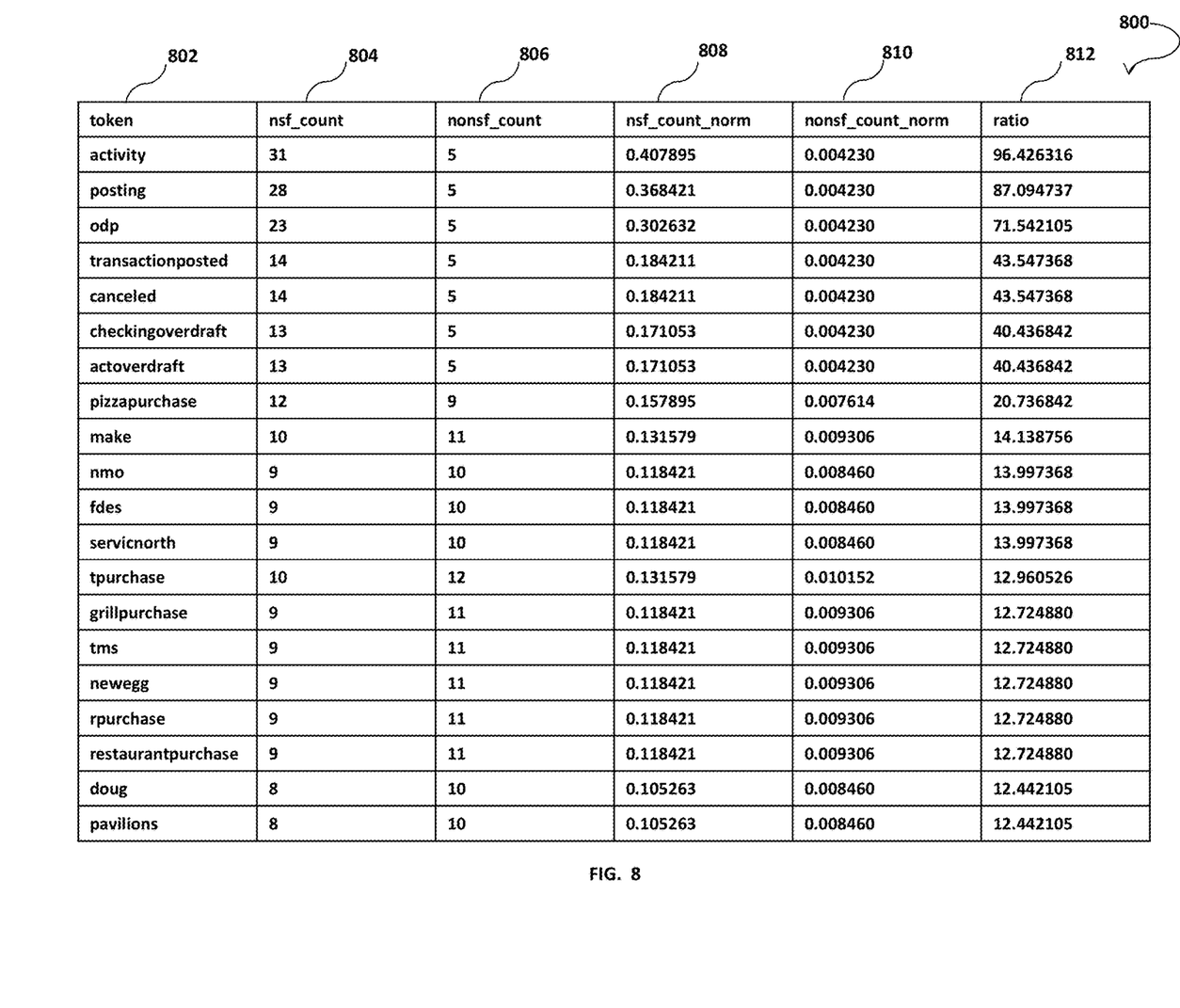
FIG. 8 shows an example of a features table comprising features most likely associated with a previously unseen and other overdraft transaction events for customers of the second financial institution.

2) generate normalized counts of the smoothed nsf_count and nonsf_count. For example, the smoothed number of times a particular token was associated with an overdraft event (nsf_count) may be normalized (nsf_count_norm) by being divided by the total number of users with overdraft events and the smoothed number of times the token was not associated with an overdraft event (nonsf_count) may be normalized by being divided by the total number of users without overdraft events. The normalized nsf_count (i.e., nsf_count_norm) may be stored in its own column (e.g., column 708) and the normalized nonsf_count (i.e., nonsf_count_norm) may be stored in its own column (e.g., column 710). Sample values for the normalized nsf_count (i.e., nsf_count_norm) and normalized nonsf_count (i.e., nonsf_count_norm) are shown in FIG. 8 (discussed below).

3) calculate the score based on the normalized counts. For example, the score for an overdraft incurred token is the normalized count of incurred overdraft users (nsf_count_norm) divided by the normalized count of never incurred overdraft users (nonsf_count_norm). In essence, the score for an incurred overdraft token is a ratio of the normalized counts. That is, the score for an overdraft incurred token (Score_NSF_Token)=nsf_count_norm/nonsf_count_norm. That score may be stored in a "score" column (e.g., column 712). Sample scores are shown in FIG. 8 (discussed below).

In one embodiment, features in group 2 (i.e., the features split into a group of transactions that did not incur an overdraft event) may be scored by taking the inverse of the score for an incurred overdraft token (Score_NSF_Token) calculated above. That is, the score for a did not incur overdraft token (Score_NONSF_Token)=1/Score_NSF_Token. That score may be stored in the score column (e.g., column 712).

In accordance with the disclosed principles, the higher the score, the more likely the token is affiliated with its group. In one embodiment, a smoothing factor is a number between 5 to 10. It should be appreciated, however, that the disclosed embodiments could use other smoothing factors, or no smoothing factor at all. A smoothing factor may be required in the above calculations to compensate for the tokens that are strongly over-expressed (as discussed below) with one of the two groups.

At step 610, labels may be assigned to the scored features and, once labeled, the highest scores for each group are recorded/stored in the evaluation database 124. For example, in one embodiment, each feature is assigned an "Incurred NSF" label or a "Did not incur NSF" label. In one embodiment, the labels are applied randomly while preserving the counts described above.

Features (e.g., tokens) that are significantly over-expressed for each of the two groups may be detected at step 612 and stored in respective feature tables at step 614. In one embodiment, "over-expressed" features/tokens are the features/tokens having a score that exceeds the highest score in the shuffled set for their group by at least a factor of 2 or more. FIG. 8 shows an example of a features table 800 of features (e.g., tokens) determined to be most likely associated with an overdraft event for customers of the second financial institution. Although not shown, there may be a similar looking features table for features (e.g., tokens) determined to be most likely not to be associated with an overdraft event for customers of the second financial institution.

In the illustrated example, the features table 800 may include a column 802 of extracted features (i.e., tokens) with scores that are over-expressed in favor of the overdraft Incurred group. In the illustrated example, these features include tokens identified as "activity," "posting," "odp," "transactionposted," "canceled," "checkingoverdraft," among others. The table 800 may also include a column 804 listing the number of times the token was associated with an overdraft event (nsf_count) and a column 806 listing the number of times the token was not associated with an overdraft event (nonsf_count). The features table 800 may also include a column 808 for a normalized number of times the token was associated with an overdraft event (nsf_count_norm), a column 810 listing a normalized number of times the token was not associated with an overdraft event (nonsf_count_norm), and a column 812 containing a score (ratio) in accordance with the disclosed principles and as described above with respect to step 608.

In this example, there were 76 users that experienced an overdraft event and 1,182 that did not. The normalized number of times the token was associated with an overdraft event (nsf_count_norm) of column 808, normalized number of times the token was not associated with an overdraft event (nonsf_count_norm) of column 810, and score (ratio) of column 812 may be determined as discussed above. In the illustrated example, the tokens, counts, and scores are prioritized such that the highest 20 scores are listed first. Although not shown, in a feature table associated for features (e.g., tokens) determined to be most likely not to be associated with an overdraft transaction event for customers of a first financial institution, the tokens, counts, and scores are prioritized such that the lowest 20 scores are listed first. As should be appreciated, the counts, normalized counts and scores are merely examples and should not be used to limit the disclosed embodiments in any way. In one embodiment, more than 20 or less than 20 scored features may be presented in the features table 800. The knowledge of overdraft and non-overdraft features/tokens (i.e., signatures of overdraft events and non-overdraft events) associated with the second financial institution may be stored in the evaluation database 124 so that they may be used in subsequent processing.

In one embodiment, by backtracking the tokens to their original descriptions, it can be confirmed if a description is an overdraft event or not. In the illustrated example, it was determined that the tokens "fdes" and "nmo" were derived from transaction descriptions such as "forced closed account fdes nmo 0009999 999999 (amount: $37.31)" and "OD protection fee refund fdes nmo 0009999 999999 (amount: $12)." Both descriptions related to a previously unseen overdraft event. With the inclusion of the tokens "fdes" and "nmo" into the evaluation database 124, the evaluation service 122 is enhanced and capable of more accurate overdraft event detection, allowing the financial management services to better predict overdraft events.

It should be appreciated that the disclosed principles provide technological advancements in the art of computerized financial management and other systems. The disclosed processing utilizes a concatenation (e.g., pipeline) of a few linear processes. As such, the disclosed embodiments are very fast (i.e., reduced linear runtime complexity) and may utilize less computing resources (e.g., memory, processor time) than conventional computerized financial management and other systems. In addition, the disclosed principles provide easy to interpret scoring and detection of events that can only be determined using the unique computer implementation disclosed herein.

Moreover, the disclosed principles help users that incur overdraft/NSF events by advising them how to improve their financial situation (e.g. calling the financial institution to have it drop/reduce NSF fees, transfer money from other resources, request a loan, check its account more often etc. In addition, organizations providing financial management services can offer additional overdraft protection/processing specifically targeted to these users.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method implemented by a first computing device, the method comprising:
   training, by the first computing device, a machine learning overdraft evaluation model by:
      extracting, by executing a tokenization process, a first set of overdraft evaluation features from a first transaction data for users associated with a first financial institution;
      splitting the first set of extracted overdraft evaluation features into a first plurality of groups;
      for each group within the first plurality of groups, generating a score for each of the extracted set of overdraft evaluation features in the group, and identifying features within the extracted set of overdraft evaluation features labeled as corresponding to an overdraft transaction event and a non-overdraft transaction event for the first financial institution;
   receiving, at the first computing device and from a second computing device connected to the first computing device through a network connection, second transaction data for users associated with transactions from a second financial institution;
   extracting a second set of overdraft evaluation features from the second transaction data;
   splitting, using the trained machine learning overdraft evaluation model, the second set of the extracted overdraft evaluation features into a second plurality of groups;
   for each group within the second plurality of groups, determining a score for each of the extracted second set of overdraft evaluation features in the group, and identifying features within the extracted second set of overdraft evaluation features based on the score to predict the transactions corresponding to overdraft transaction events for the second financial institution;
   detecting at least one feature in the extracted second set of overdraft evaluation features, the at least one feature associated with an overdraft transaction event for the second financial institution, and the at least one feature missing from previously stored feature signatures corresponding to overdraft transaction events for the first financial institution; and
   setting the at least one feature as a new feature signature as associated with overdraft transaction events.

2. The method of claim 1, wherein each extracted overdraft evaluation feature, of the second set of overdraft evaluation features, comprises a token extracted from a description of a transaction within the second transaction data by removing punctuation through a tokenization process, each token comprising one or more words or parts of words with no punctuation.

3. The method of claim 1, wherein splitting the second set of the extracted overdraft evaluation features comprises classifying a group of features affiliated with each transaction from the second financial institution to be associated with an overdraft transaction event or a non-overdraft transaction event based on the highest score of the corresponding features from the previously stored feature signatures associated with the first institution; and wherein the second plurality of groups comprises a first group associated with an overdraft transaction event and a second group associated with a transaction event that was not an overdraft transaction event.

4. The method of claim 1, wherein identifying a feature within the second set of the extracted overdraft evaluation features corresponding to an overdraft transaction event for the second financial institution comprises determining if the score for the feature is over-expressed in relation to scores of other features within the associated group.

5. The method of claim 1, wherein determining the score for each extracted overdraft evaluation feature in the extracted second set of overdraft evaluation features in the group comprises:
   determining a number of times the extracted overdraft evaluation feature is associated with an overdraft transaction event;
   determining a number of times the extracted overdraft evaluation feature is not associated with an overdraft transaction event;
   generating a first normalized count for the determined number of times the extracted overdraft evaluation feature is associated with an overdraft transaction event;
   generating a second normalized count for the determined number of times the extracted overdraft evaluation feature is not associated with an overdraft transaction event;
   generating the corresponding score based on the generated first and second normalized counts; and
   generating a feature table comprising respective features, counts and scores of the group, each feature labeled to correspond to an overdraft transaction event or a non-overdraft transaction event associated with the transaction data of the second financial institution.

6. The method of claim 1, further comprising storing feature signatures of the identified features corresponding to an overdraft transaction event for the second financial institution with the previously stored feature signatures associated with transactions at the first financial institution.

7. The method of claim 1, wherein the previously stored feature signatures associated with the transactions at the first financial institution are input from the trained machine learning overdraft evaluation model.

8. The method of claim 1, further comprising:
receiving, at the first computing device and from another computing device connected to the first computing device through the first network connection, the first transaction data for users associated with the first financial institution; and
extracting, by executing the tokenization process, the first set of overdraft evaluation features from the first transaction data by discarding punctuation.

9. The method of claim 8, wherein identifying a feature within the first set of overdraft evaluation features corresponding to an overdraft transaction event for the first financial institution comprises determining if the score for the feature is over-expressed in relation to scores of other features within the associated group of the first plurality of groups and wherein generating the score for each extracted overdraft evaluation feature in a group of the first plurality of groups comprises:
determining a number of times the feature is associated with an overdraft event;
determining a number of times the feature is not associated with an overdraft event;
generating a first normalized count for the determined number of times the feature is associated with an overdraft event;
generating a second normalized count for the determined number of times the feature is not associated with an overdraft event;
generating the score based on the generated first and second normalized counts;
generating a feature table comprising respective features, counts and scores of the first set of overdraft evaluation features labeled corresponding to an overdraft transaction event and a non-overdraft transaction event, the features being prioritized based on the scores; and
storing the feature signatures based on the feature table associated with the transactions at the first financial institution in an evaluation database of the first computing device.

10. A system for detecting overdraft transaction events, said system comprising:
a first computing device, the first computing device comprising a non-volatile memory, and
a processor coupled to the memory, the memory storing executable instructions, the instructions when executed by the processor cause the processor to:
train a machine learning overdraft evaluation model by:
extracting, by executing a tokenization process, a first set of overdraft evaluation features from a first transaction data for users associated with a first financial institution;
splitting the first set of extracted overdraft evaluation features into a first plurality of groups;
for each group within the first plurality of groups, generating a score for each of the extracted set of overdraft evaluation features in the group, and identifying features within the extracted set of overdraft evaluation features labeled as corresponding to an overdraft transaction event and a non-overdraft transaction event for the first financial institution;
receive second transaction data from a second computing device connected to the processor through a network connection;
extract a second set of overdraft evaluation features from the second transaction data;
split, using the trained machine learning overdraft evaluation model, the second set of the extracted overdraft evaluation features into a second plurality of groups;
for each group within the second plurality of groups, determine a score for each of the extracted second set of overdraft evaluation features in the group, and identify features within the extracted second set of overdraft evaluation features based on the score to predict the transactions corresponding to overdraft transaction events for the second financial institution;
detect at least one feature in the extracted second set of overdraft evaluation features, the at least one feature associated with an overdraft transaction event for the second financial institution, and the at least one feature missing from previously stored feature signatures corresponding to overdraft transaction events for the first financial institution; and
set the at least one feature as a new feature signature as associated with overdraft transaction events.

11. The system of claim 10, wherein each extracted overdraft evaluation feature, of the second set of overdraft evaluation features, comprises a token extracted from a description of a transaction within the second transaction data by removing punctuation through a tokenization process executed by the processor, each token comprising one or more words or parts of words with no punctuation.

12. The system of claim 10, wherein the second plurality of groups comprise a first group associated with an overdraft transaction event and a second group associated with a transaction event that was not an overdraft transaction event and wherein identifying a feature within the second set of extracted overdraft evaluation features as corresponding to an overdraft transaction event for the second financial institution comprises determining if the score for the feature is over-expressed in relation to scores of other features within the associated group.

13. The system of claim 12, wherein a feature is over-expressed in relation to scores of other features within the associated group when its score exceeds a highest score in the group by at least a factor of two and wherein to determine a score of each extracted overdraft evaluation feature in a group comprises:
determining a number of times the feature is associated with an overdraft event;
determining a number of times the feature is not associated with an overdraft event;
generating a first normalized count for the determined number of times the feature is associated with an overdraft event;
generating a second normalized count for the determined number of times the feature is not associated with an overdraft event;
generating the score based on the generated first and second normalized counts; and generating a feature table comprising respective features, counts and scores of the group, each feature labeled corresponding to an overdraft transaction event or a non-overdraft transaction event associated with the transaction data of the second financial institution.

14. The system of claim 10, wherein feature signatures of the identified features corresponding to an overdraft transaction event for the second financial institution with the previously stored the feature signatures associated with transactions at the first financial institution are stored in the memory.

15. The system of claim 10, wherein the previously stored feature signatures associated with the transactions at the first financial institution are input from the trained machine learning overdraft evaluation model.

16. The system of claim 15, wherein the instructions when executed by the processor cause the processor to:
receive, at the processor and from another computing device connected to the first computing device through the first network connection, the first transaction data for users associated with the first financial institution.

17. The system of claim 16, wherein identifying a feature within the extracted first set of overdraft evaluation features as corresponding to an overdraft transaction event for the first financial institution comprises determining if the score for the feature is over-expressed in relation to scores of other features within the associated group within of the first plurality of groups.

18. The system of claim 17, wherein a feature is over-expressed in relation to scores of other features within the associated group when its score exceeds a highest score in the group within of the first plurality of groups by at least a factor of two.

19. The system of claim 16, wherein scoring each extracted overdraft evaluation feature in a group within of the first plurality of groups comprises:
determining a number of times the feature is associated with an overdraft event;
determining a number of times the feature is not associated with an overdraft event;
generating a first normalized count for the determined number of times the feature is associated with an overdraft event;
generating a second normalized count for the determined number of times the feature is not associated with an overdraft event;
generating the score based on the generated first normalized and second normalized counts;
generating a feature table comprising respective features, counts and scores of the second set of overdraft evaluation features labeled corresponding to an overdraft transaction event and a non-overdraft transaction event, the features being prioritized based on the scores, and
storing the feature signatures based on the feature table associated with the transactions at the first financial institution in an evaluation database of the first computing device.

20. A system for detecting overdraft transaction events said system comprising:
a first computing device, the first computing device comprising a non-volatile memory, and a processor coupled to the memory, the memory storing executable instructions, the instructions when executed by the processor cause the processor to:
train a machine learning overdraft evaluation model by:
extracting, by executing a tokenization process, a first set of overdraft evaluation features from a first transaction data for users associated with a first financial institution;
splitting the first set of extracted overdraft evaluation features into a plurality of groups;
for each group within the plurality of groups, generating a score for each of the extracted set of overdraft evaluation features in the group, and identifying features within the extracted set of overdraft evaluation features labeled as corresponding to an overdraft transaction event and a non-overdraft transaction event for the first financial institution;
receive a second transaction data from a second computing device connected to the processor through a network connection;
extract tokens from the first transaction data by removing punctuation, each token comprising one or more words or parts of words without punctuation;
split, using the trained machine learning overdraft evaluation model, a set of the extracted tokens into a first group associated with an overdraft transaction event and a second group associated with a transaction event that was not an overdraft transaction event;
for each group within the first and second groups, determine a score for each of the extracted tokens in the group, and identify features within the extracted token based on the score to predict the transactions corresponding to an overdraft transaction event for the second financial institution by:
determining a number of times the feature is associated with an overdraft event;
determining a number of times the token is not associated with an overdraft event;
generating a first normalized count for the determined number of times the token is associated with an overdraft event;
generating a second normalized count for the determined number of times the token is not associated with an overdraft event;
generating the score for the feature based on a ratio of the first normalized count to the second normalized count;
detect, based on the corresponding scores, at least one feature within the extracted set of tokens, the at least one feature associated with an overdraft transaction event for the second financial institution, and the at least one feature missing from features corresponding to overdraft transaction events for the first financial institution; and
set the at least one feature as a new feature signature as associated with overdraft transaction events.

* * * * *